United States Patent
Gray et al.

(10) Patent No.: US 11,716,206 B2
(45) Date of Patent: Aug. 1, 2023

(54) CERTIFICATE BASED SECURITY USING POST QUANTUM CRYPTOGRAPHY

(71) Applicant: International Business Machines Corporation, Armonk, NY (US)

(72) Inventors: Michael W. Gray, Guanaba (AU); Narayana Aditya Madineni, Southport (AU); Simon D. McMahon, Gold Coast (AU); Matthew Green, Ashmore (AU); Peter T. Waltenberg, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 17/086,510

(22) Filed: Nov. 2, 2020

(65) Prior Publication Data

US 2022/0141039 A1 May 5, 2022

(51) Int. Cl.
*H04L 9/32* (2006.01)
*H04L 9/14* (2006.01)
(Continued)

(52) U.S. Cl.
CPC .............. *H04L 9/3263* (2013.01); *H04L 9/14* (2013.01); *H04L 9/3093* (2013.01); *H04L 9/3236* (2013.01)

(58) Field of Classification Search
CPC ....... H04L 9/3263; H04L 9/14; H04L 9/3093; H04L 9/3236
See application file for complete search history.

(56) References Cited

U.S. PATENT DOCUMENTS 9,660,978 B1 5/2017 Truskovsky
9,667,619 B1 * 5/2017 Vera-Schockner ... H04L 63/166
(Continued)

FOREIGN PATENT DOCUMENTS

CN 103314550 B * 10/2016 ......... H04L 63/0823
CN 114584290 A 6/2022
(Continued)

OTHER PUBLICATIONS

Application No. GB2116490.0. Patents Act 1977: Combined Search and Examination Report under Sections 17 and 18(3), dated Apr. 26, 2022. 6 pgs.
(Continued)

*Primary Examiner* — Darshan I Dhruv
(74) *Attorney, Agent, or Firm* — David K. Mattheis

(57) ABSTRACT

Establishing secure communications by sending a server certificate message, the certificate message including a first certificate associated with a first encryption algorithm and a second certificate associated with a second encryption algorithm, the first certificate and second certificate bound to each other, signing a first message associated with client-server communications using a first private key, the first private key associated with the first certificate, signing a second message associated with the client-server communications using a second private key, the second private key associated with the second certificate, the second message including the signed first message, and sending a server certificate verify message, the server certificate verify message comprising the signed first message and the signed second message.

17 Claims, 5 Drawing Sheets

(51) Int. Cl.
*H04L 9/38* (2006.01)
*H04L 9/30* (2006.01)

(56) References Cited

U.S. PATENT DOCUMENTS

| | | | |
|---|---|---|---|
| 9,794,249 B1* | 10/2017 | Truskovsky | H04L 9/006 |
| 10,063,591 B1* | 8/2018 | Jiang | H04L 63/1416 |
| 10,298,404 B1* | 5/2019 | Behm | H04L 9/3247 |
| 10,425,401 B1 | 9/2019 | Pecen | |
| 10,511,591 B2 | 12/2019 | Campagna | |
| 10,630,655 B2 | 4/2020 | Becker | |
| 10,742,420 B1 | 8/2020 | Griffin | |
| 2012/0011566 A1* | 1/2012 | Youm | H04L 9/083 726/3 |
| 2014/0095865 A1* | 4/2014 | Yerra | H04L 9/3271 713/156 |
| 2017/0359185 A1* | 12/2017 | Hang | H04L 9/0897 |
| 2019/0319804 A1 | 10/2019 | Mathew | |
| 2020/0028699 A1* | 1/2020 | Sharifi Mehr | H04L 9/14 |
| 2020/0082738 A1* | 3/2020 | Poeppelmann | H04L 9/002 |
| 2020/0196122 A1* | 6/2020 | Junk | H04L 9/3066 |
| 2020/0259647 A1 | 8/2020 | Goncalves | |
| 2021/0377049 A1* | 12/2021 | Nix | H04L 9/0852 |
| 2022/0052859 A1* | 2/2022 | Marzorati | H04L 63/0428 |
| 2022/0075877 A1* | 3/2022 | Helms | G06Q 20/405 |
| 2022/0141039 A1 | 5/2022 | Gray | |
| 2022/0173915 A1 | 6/2022 | Gray | |
| 2022/0248221 A1* | 8/2022 | Nix | H04L 63/06 |

FOREIGN PATENT DOCUMENTS

| | | | | |
|---|---|---|---|---|
| DE | 1020211295149 A | 6/2022 | | |
| EP | 2068264 A2 * | 6/2009 | | G06F 21/33 |
| EP | 3361695 A1 * | 8/2018 | | H04L 63/0227 |
| EP | 3432509 A1 | 1/2019 | | |
| JP | 2022087841 A | 6/2022 | | |
| WO | 2013173408 A1 | 11/2013 | | |
| WO | 2020123959 A1 | 6/2020 | | |
| WO | 2022090405 A1 | 5/2022 | | |

OTHER PUBLICATIONS

Burstinghaus-Steinbach et al: "Post-Quantum TLS on Embedded Systems: Integrating and Evaluating Kyber and SPHINCS+ with mbed TLS", Oct. 5, 2020, 12 pps.
J. Sepúlveda, S. Liu and J. M. Bermudo Mera, "Post-Quantum Enabled Cyber Physical Systems," in IEEE Embedded Systems Letters, vol. 11, No. 4, pp. 106-110, Dec. 2019, doi: 10.1109/LES.2019.2895392.
List of IBM Patents or Patent Applications Treated as Related (signed 2022) 2 pages.
Paul, S., Scheible, P. (2020). Towards Post-Quantum Security for Cyber-Physical Systems: Integrating PQC into Industrial M2M Communication. In: Chen, L., Li, N., Liang, K., Schneider, S. (eds) Computer Security—ESORICS 2020. ESORICS 2020. Lecture Notes in Computer Science(), vol. 12309. Springer, Cham. https://doi.org/10.1007/978-3-030-59013-0_15.
International Search Report and Written Opinion dated Jan. 28, 2022 from PCT Application No. PCT/EP2021/080014 filed Oct. 28, 2021, 11 pps.
Kampanakis et al., "The Viability of Post-Quantum X.509 Certificates", Published 2018, Computer Science, 21 pages.
Tan et al., "A Survey of Digital Signing in the Post Quantum Era", Nov. 29, 2019, 30 pps.
"Post-Quantum TLS", Microsoft, retrieved from the Internet on Aug. 31, 2020, 3 pages, <https://www.microsoft.com/en-us/research/project/post-quantum-tls/>.
Mell et al., "The NIST Definition of Cloud Computing", Recommendations of the National Institute of Standards and Technology, Special Publication 800-145, Sep. 2011, 7 pages.
Sikeridis et al., "Post-Quantum Authentication in TLS 1.3: A Performance Study", Network and Distributed Systems Security (NDSS) Symposium 2020, Feb. 23-26, 2020, San Diego, CA, USA, 16 pages, <https://dx.doi.org/10.14722/ndss.2020.24203>.

* cited by examiner

CERTIFICATE BASED SECURITY USING POST QUANTUM CRYPTOGRAPHY

BACKGROUND

The disclosure relates generally to establishing secure network communications. The disclosure relates particularly to communications handshakes utilizing multiple certificates and a combination of encryption algorithms.

The advent of large-scale quantum computing systems raises the possibility that the use of Shor's algorithm and such quantum devices may compromise traditional cryptographic algorithms such as RSA (Rivest-Shamir-Adleman), ECC, (elliptic curve cryptography) or similar techniques. Further, though such a means to compromise traditional cryptographic algorithms is not currently available, the security of current encrypted communications and data storage systems will be at risk once such systems become available. What is needed is a security protocol which will protect communications and data both now and, in the future, once traditional cryptographic methods are no longer sufficient. Legacy communications and data storage protocols must be enhanced to provide this additional protection without disrupting the current protocols.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the establishment of secure network communications channels using certificates.

Aspects of the invention disclose methods, systems and computer readable media associated with establishing secure communications by sending a server certificate message, the certificate message including a first certificate associated with a first encryption algorithm and a second certificate associated with a second encryption algorithm, the first certificate and second certificate bound to each other, signing a first message associated with client-server communications using a first private key, the first private key associated with the first certificate, signing a second message associated with the client-server communications using a second private key, the second private key associated with the second certificate, the second message including the signed first message, and sending a server certificate verify message, the server certificate verify message comprising the signed first message and the signed second message.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
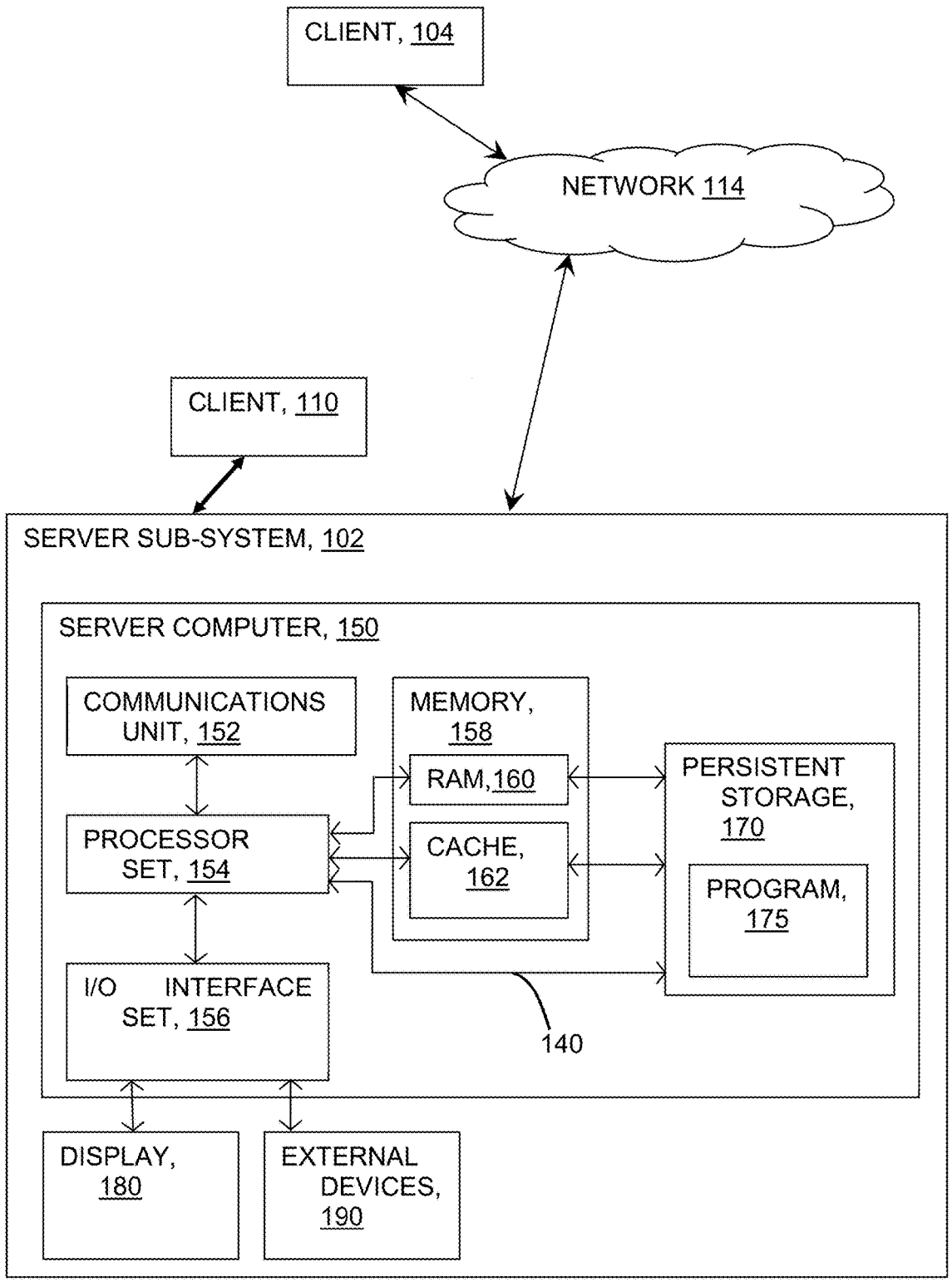
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., sending and receiving communications protocol messages, verifying entity identities, validating digital certificates, validating digital signature, etc.). These solutions are not abstract and cannot be performed as a set of mental acts by a human due to the processing capabilities needed to facilitate establishing secure client-server communications links, for example. Further, some of the processes performed may be performed by a specialized computer for carrying out defined tasks related to securing communications. For example, a specialized computer can be employed to carry out tasks related to communications security handshake protocols, or the like.

Aspects of the invention disclose methods, systems and computer readable media associated with establishing secure communications by receiving a client hello message from a client device, sending a server hello message, sending a server certificate message, the certificate message including a first certificate associated with a first encryption algorithm and a second certificate associated with a second encryption algorithm, the first certificate and second certificate bound to each other, signing a first message associated with client-server communications using a first private key, the first private key associated with the first certificate, signing a second message associated with the client-server communications using a second private key, the second private key associated with the second certificate, the second message including the signed first message, sending a server certificate verify message, the server certificate verify message comprising the signed first message and the signed second message, receiving, by the one or more server computer processors, a client certificate message in response to the server hello message, the client certificate message comprising a third certificate associated with the first encryption algorithm and a fourth certificate associated with the second encryption algorithm, the third certificate and fourth certificate bound to each other, receiving, by the one or more server computer processors, a client certificate verify message, the client certificate verify message comprising a third message associated with client-server communications signed using a third private key, the third private key associated with the third certificate, and a fourth message associated with the client-server communications signed using a fourth private key, the fourth private key associated with the fourth certificate, the fourth message including the third message, and receiving a client finished message from the client device, and sending a server finished message in response to receiving the client finished message.

Disclosed embodiments provide the benefits of linking two certificates, one based upon traditional cryptographic methods, and one based upon lattice or post quantum cryptographic (PQC) methods in a way that ensures a secure communications link established through the two certificates unless both the PQC and TC methods are broken by a malicious actor.

Traditional cryptographic methods (TC) based upon RSA or ECC are vulnerable to being broken by the use of large-scale quantum computers. RSA and ECC are based upon the use of large prime numbers which are multiplied together yielding a result. A large-scale quantum computer, using Shor's algorithm, should be able to easily defeat an encryption algorithm based upon the use of factors, such as RSA or ECC.

Internet communications between computing entities include an initial "handshake" between the entities. The entities' initial, unencrypted communications occur over the course of the handshake introducing the entities to each other. Through the handshake, the entities exchange unencrypted information necessary to establish the attributes of the ensuing communications between the entities. The attributes include the exchange of information needed to establish the encryption protocol which will be used for encrypting and decrypting data, as well as information necessary for the entities to verify each other's identity including public keys.

Typical communications handshakes, such as a transport level security (TLS) handshake, rely upon public key certificates, such as an x.509 certificate, validated by secure digital signatures based upon RSA, ECC, or a similar traditional factor-based encryption public key infrastructure. A malicious actor may have access to the handshake communications, may break the TC of one of the parties and may then impersonate that party using a falsified private key.

Lattice-based encryption algorithms use public-private key pairs generated using lattice, or array-based mathematics. Such algorithms are thought not susceptible to being broken through the use of a quantum computer. Such algorithms are considered post-quantum cryptographic (PQC) algorithms.

As legacy TLS protocols are based upon the use of TC, simply replacing the TC with PQC may introduce backwards compatibility issues into global internet communications. What is needed is a backwards compatible communication linking protocol which is not susceptible to being broken through the use of a quantum computer. Disclosed methods prevent this by the use of two certificates which are cryptographically bound to each other, a TC, factor-based certificate and a PQC, lattice-based certificate. Each of the two certificates are issued by a certificate authority (CA) trusted by the entities. The malicious actor cannot break the lattice-based encryption with the quantum computer. The hybrid handshake protocol based upon the combination of a TC certificate cryptographically bound to a PQC certificate enables the establishment of communications links between networked entities in a post-quantum world.

In TLS terms, each of the server's certificate and certificate verify messages includes two sets of certificate chains and two sets of verifications data, respectively. The messages are structured as two message each to simplify processing and enable the use of current TLS message processing logic. Disclosed embodiments enable secure communications by requiring that PQC verification data is validated before TC verification data may be validated. PQC must be broken before the TC can be attacked. A malicious actor must break both the PQC and the TC to successfully attack the communications link.

A TLS handshake begins with a client device sending a client hello message to a server. The handshake proceeds with the server responding to the client hello message by sending a server hello message. The exchange of the hello messages includes a negotiation of the encryption protocol to be used and the exchange of client and server generated random numbers to be used in subsequent exchanges of encrypted data. As an example, the client hello message includes the TLS version used by the client, compression methods to be used, cipher suite options supported by the client for the communications, and a random character string to be used for encrypted data exchanges. The client hello message may include one or more extensions such as an encryption extension for encrypting TLS handshake data following the hello messages. The server hello message may include the servers' choice of cipher suites from the provided options, and a different random number for use in encrypting the communications.

The server then sends a TLS certificate message to the client. The TLS certificate message includes two certificate chains embedded in the message, one based on TC and one based on PQC. The two certificate chains may each include a series of certificates, starting with an end-entity certificate of the server, including one or more intermediate certificates and ending with a root certificate. The root certificate is issued and signed by a certificate authority trusted by the entities. In an embodiment, the certificate chains each include a single certificate.

Upon receipt of the server certificate message, the client device decodes the two certificate chains and validates each certificate chain independently. The client ensures that each certificate of each of the two certificate chains has not expired or been revoked, that the domain name of the certificate matches the domain of the server, that the digital signature of each certificate of each chain is valid and that the root certificate of each chain was issued by a CA trusted by the client.

In an embodiment, the client uses the public key of the CA to validate the signature of the server's end-entity certificate. In an embodiment, the client uses the public key from an intermediate certificate to validate the signature of the end entity certificate and uses the public key of the CA root certificate to validate the root certificate signature and the intermediate certificate signature.

For the TC certificate chain, the public keys and digital signatures are based upon a TC public-private key pair. For the PQC certificate chain, the signatures and public keys are based upon a public-private key pair derived using the PQC algorithm.

PQC algorithms include lattice-based encryption methods including CRYSTALS-DILITHIUM, FALCON, RAINBOW, CLASSIC McELIECE, CRYSTALS-KYBER, NTRU, SABER, and other lattice-based algorithms. (Note: the term(s) "CRYSTALS-DILITHIUM", "FALCON", "RAINBOW", "CLASSIC McELIECE", "CRYSTALS-KYBER", "NTRU", and "SABER" may be subject to trademark rights in various jurisdictions throughout the world and are used here only in reference to the products or services properly denominated by the marks to the extent that such trademark rights may exist.)

In an embodiment, the server composes a certificate verify message for the client. The certificate verify message serves to provide proof that the server has possession of the PQC and TC private keys associated with the PQC and TC certificates respectively. The certificate verify message includes two messages. The first message includes the current transcript of the messages exchanged between the client and the server up to this point, signed using the private PQC key of the server. The second message includes the current transcript of the exchanged messages appended by the server with the first message, the appended transcript signed using the TC private key of the server, generating a traditional server certificate verify message. The server combines the first and second certificate verify messages and sends the combination as a single certificate verify message to the client.

The client receives the combined certificate verify messages and separates the two messages. The client has possession of the current messaging transcript and the public PQC key of the server—from the process of validating the PQC certificate of the server. The client uses the current messaging transcript and server PQC public key to verify the PQC digital signature of the PQC certificate verify portion of the server certificate verify message. The client verifies the TC signature of the TC portion of the combined server certificate message using the message transcript including the signed first message contents provided in the PQC portion of the combined server certificate verify message. The client uses the appended messaging transcript and the server's public TC key, obtained during the process of validating the server's TC certificate.

In an embodiment, the method further binds the TC and PQC certificates. The method creates the PQC and TC certificates having the same subject name, issuer name, and subject alternative name. The method sets the constraints of the TC as identical to those of the PQC with the exceptions of the serial number the public keys, and the signatures of the two certificates. In this embodiment, the method sets the serial number or an extension of the TC equal to a hash (SHA1, SHA256, or other hash function) of the PQC certificate data. A binding value set as the output of a hash function cannot be broken using a large-scale quantum computer or a traditional non-quantum computer. In this embodiment, the client validates that the TC serial number or extension when used contains the hash of the PQC certificate data and that all other TC and PQC certificate data attributes match.

In an embodiment, mutual entity verification is desired as indicated by a certificate request message sent from the server to the client. In response to the certificate request message, the client sends a certificate message including each of a client TC and PQC certificate. The client then generates and sends a combined certificate verify message. This includes creating a first certificate verify message by signing the current message transcript with the client's PQC private key, and then appending the first certificate verify message to the current messaging transcript and signing the appended transcript using the client's TC private key.

In an embodiment, the exchange of client and server hello messages does not result in the use of the PQC certificate as the client does not provide support for its use. In this embodiment, the method passes only the TC certificate and TC certificate verify portions of the messages. In this embodiment, the method provides backward compatibility during any time frame where all network entities haven't transitioned to the use of PQC-based protocols.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise communications security program (not shown) together with sufficient computing resource (processor, memory, network communications hardware) to execute the program. Communications handshakes between client devices 104, 110 and server sub-system 102 may include the use of disclosed embodiments to enable secure communications between verified entities as well as the exchange of encrypted data. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the communications security program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., communications security program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
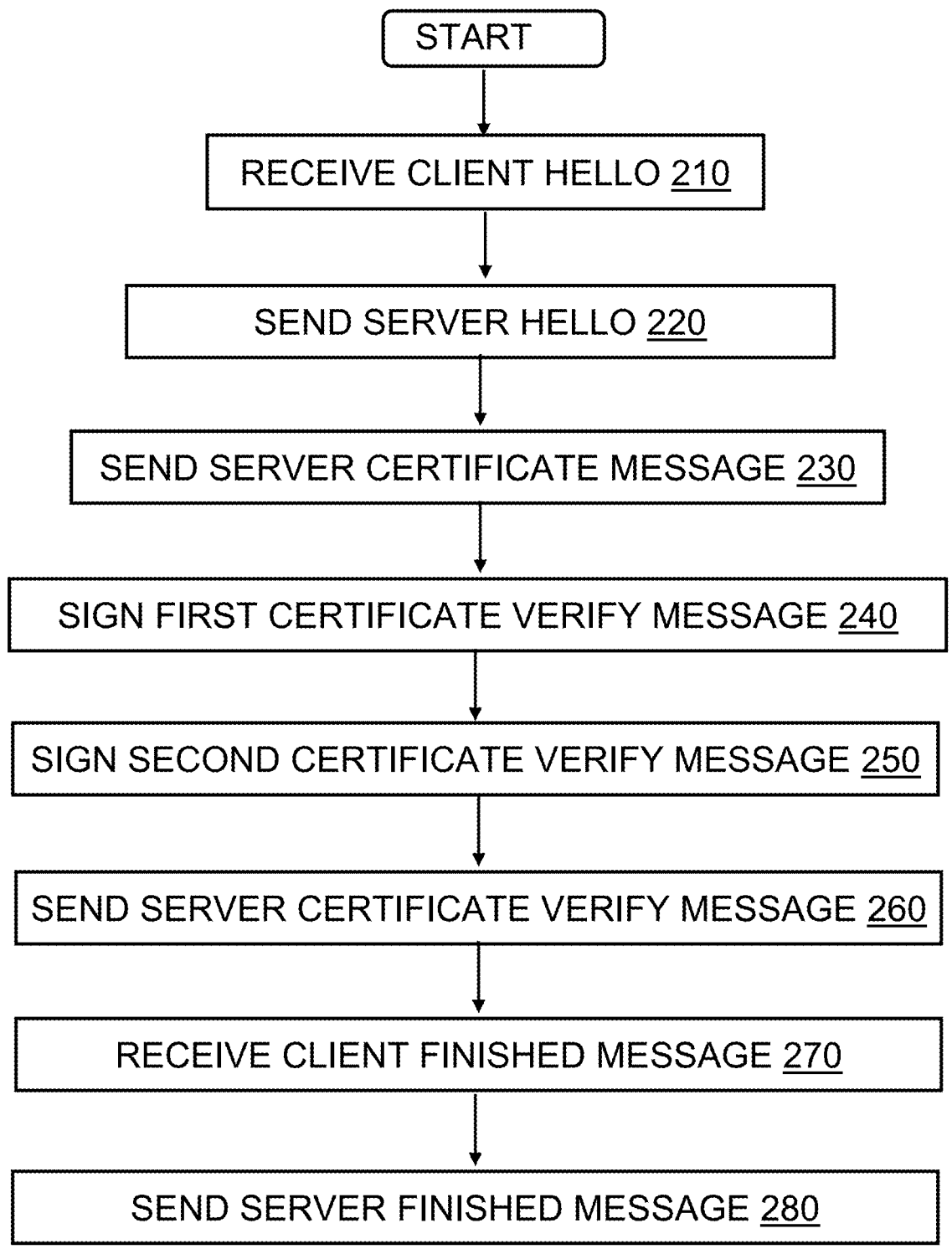
FIG. 2 provides a flowchart depicting an operational sequence, according to an embodiment of the invention.

FIG. 2 provides a flowchart 200, illustrating exemplary activities associated with the practice of the disclosure. After program start, at block 210, communications security program 175 of a server receives a client hello message including client information regarding supported TLS protocols, cipher suite options and client generated random number.

At block 220, the server sends a server hello message indicating the server's choice of cipher suite from the options provided and including a server generated random number.

At block 230, the server sends a server certificate message. The server certificate message includes two certificates or certificate chains. The certificates or certificate chains include a first certificate or certificate chain signed using a first digital signature associated with a first server private key from a PQC algorithm, and a second certificate, or certificate chain signed using a second digital signature associated with a second server private key from a TC encryption algorithm.

At block 240, communications security program 175 of the server signs a first message using the first server PQC private key, the message includes the transcript of the client-server messaging.

At block 250, communications security program 175 of the server signs a second message with the second server TC private key. The second message includes the current client-server messaging transcript appended to include the first message.

At block 260, communications security program 175 of the server combines the first and second messages into a single server certificate verify message and sends the combined messages to the client.

At block 270, communications security program 175 receives a client finished message from the client. The client finished message includes a cryptographic hash of all previous client-server messaging, encrypted using an agreed upon encryption algorithm.

At block 280, communications security program 175 sends a server finished message including a cryptographic hash of all previous client-server messaging traffic from the handshake protocol.

It is understood that the TLS handshake protocol may include additional messages between the client and server relating to the exchange of information necessary to generate an encryption key for the encryption/decryption of data and other purposes.

Figure 3:
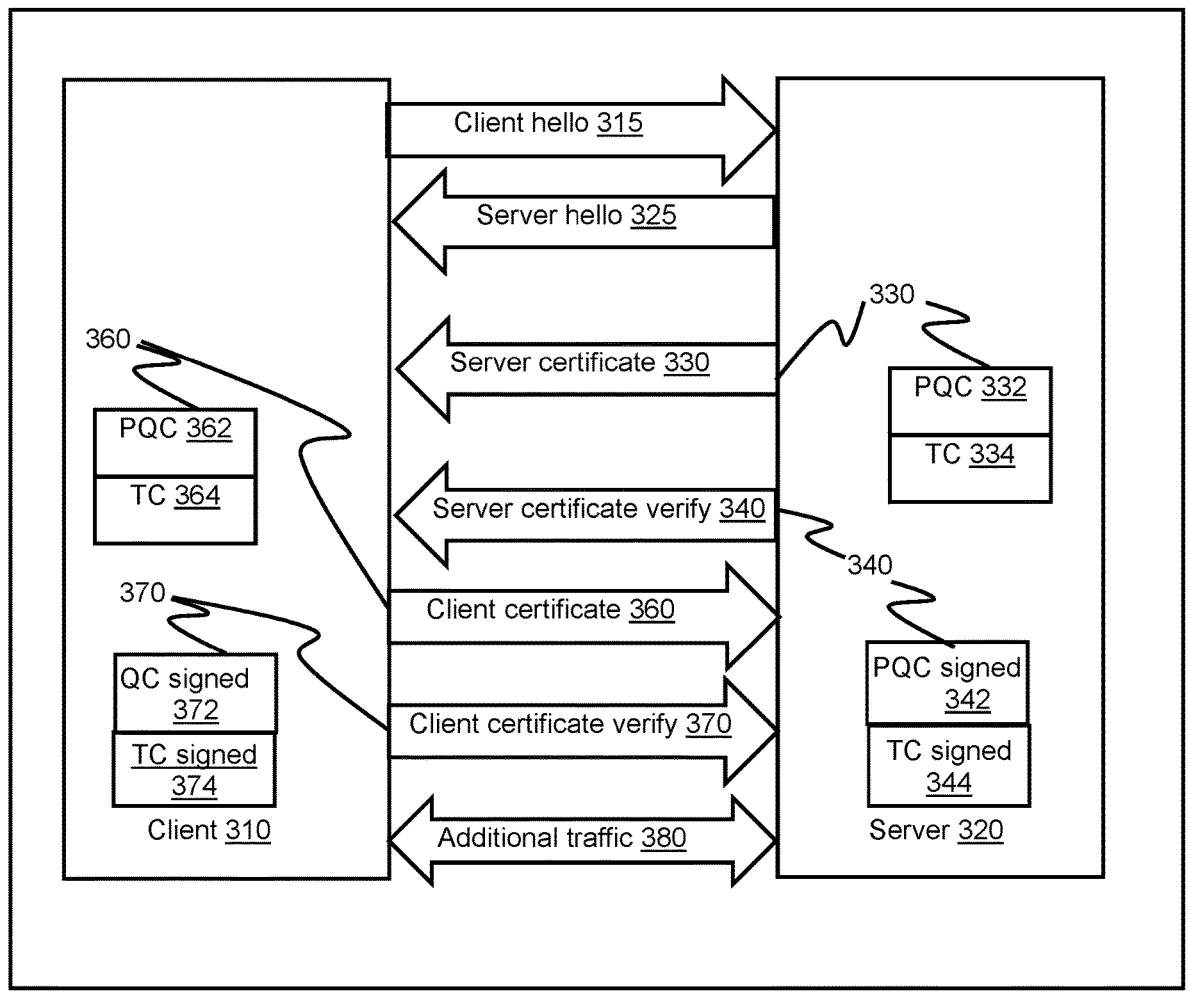
FIG. 3 provides a schematic depicting a client-server handshake sequence, according to an embodiment of the invention.

Schematic 300 of FIG. 3 illustrates messaging traffic between a client 310 and server 320, according to an embodiment of the invention. As shown in the Figure, a client 310, sends a client hello message 315 to the server 320. Server 320 responds by sending a server hello message 325, a server certificate message 330, and a server certificate verify message 340. Each of the server certificate message 330, and server certificate verify message 340, include two separate messages. Server certificate message 330 includes a server PQC certificate message 332 and a server TC certificate message 334. Server certificate verify message 340 includes a first message 342 signed with a server PQC private key and including the messaging transcript while the second message 344 includes the messaging transcript appended with the first message and signed using a server TC private key.

FIG. 3 includes the messages associated with mutual verification including a client certificate message 360 and client certificate verify message 370. Similarly, to the server, client certificate message 360 includes two messages, a client PQC certificate message 362 and a client TC certificate message 364. Client certificate verify message 370 also includes two messages, one 372 including the messaging transcript and signed using the client's PQC private key, the other 374 including the messaging transcript appended to include the message signed using the client PQC private key, this message signed using the client's TC private key. Item 380 generally illustrated additional client-server messaging traffic related to the communications handshake between the client and server including client finished and server finished messages.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
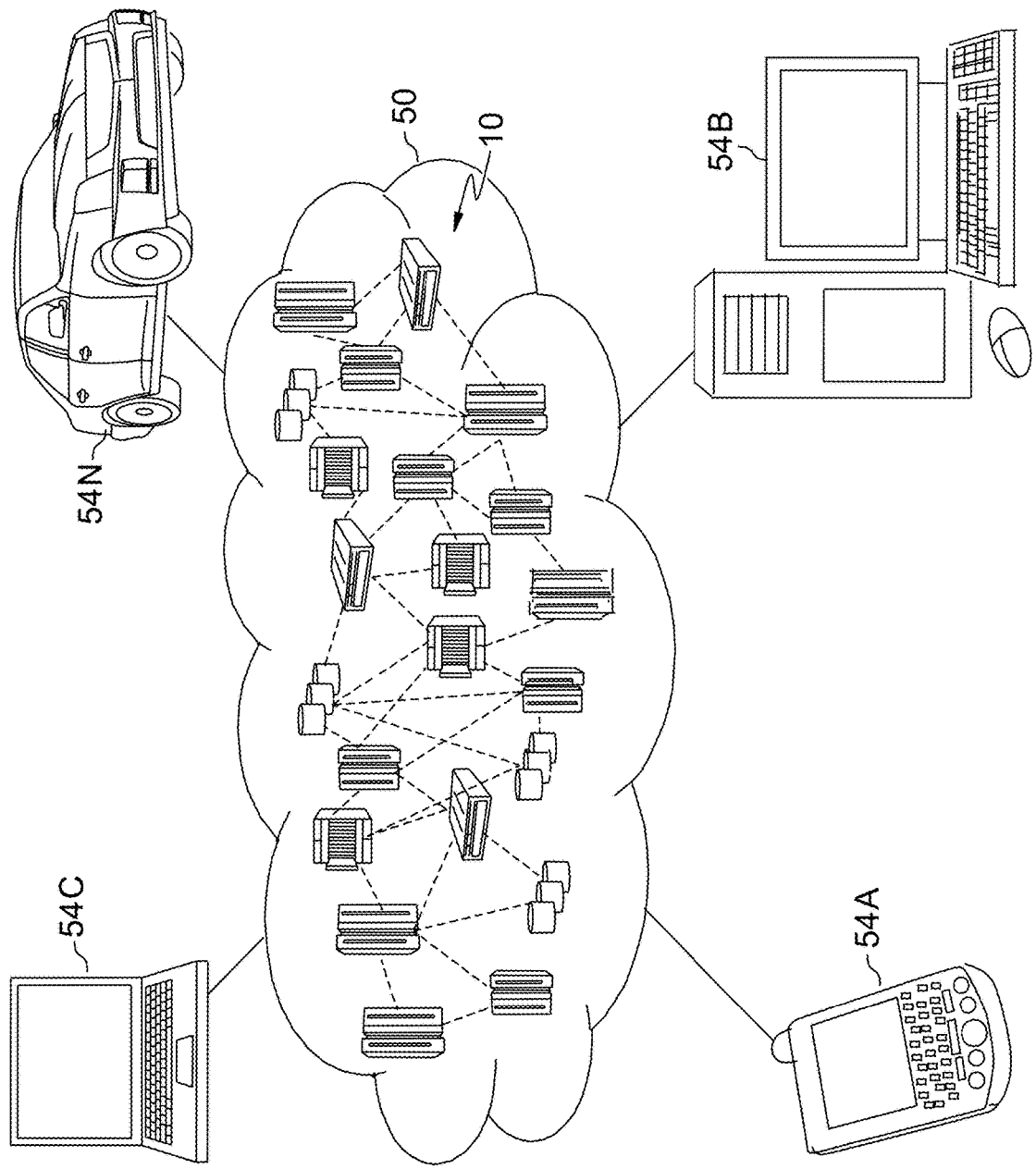
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
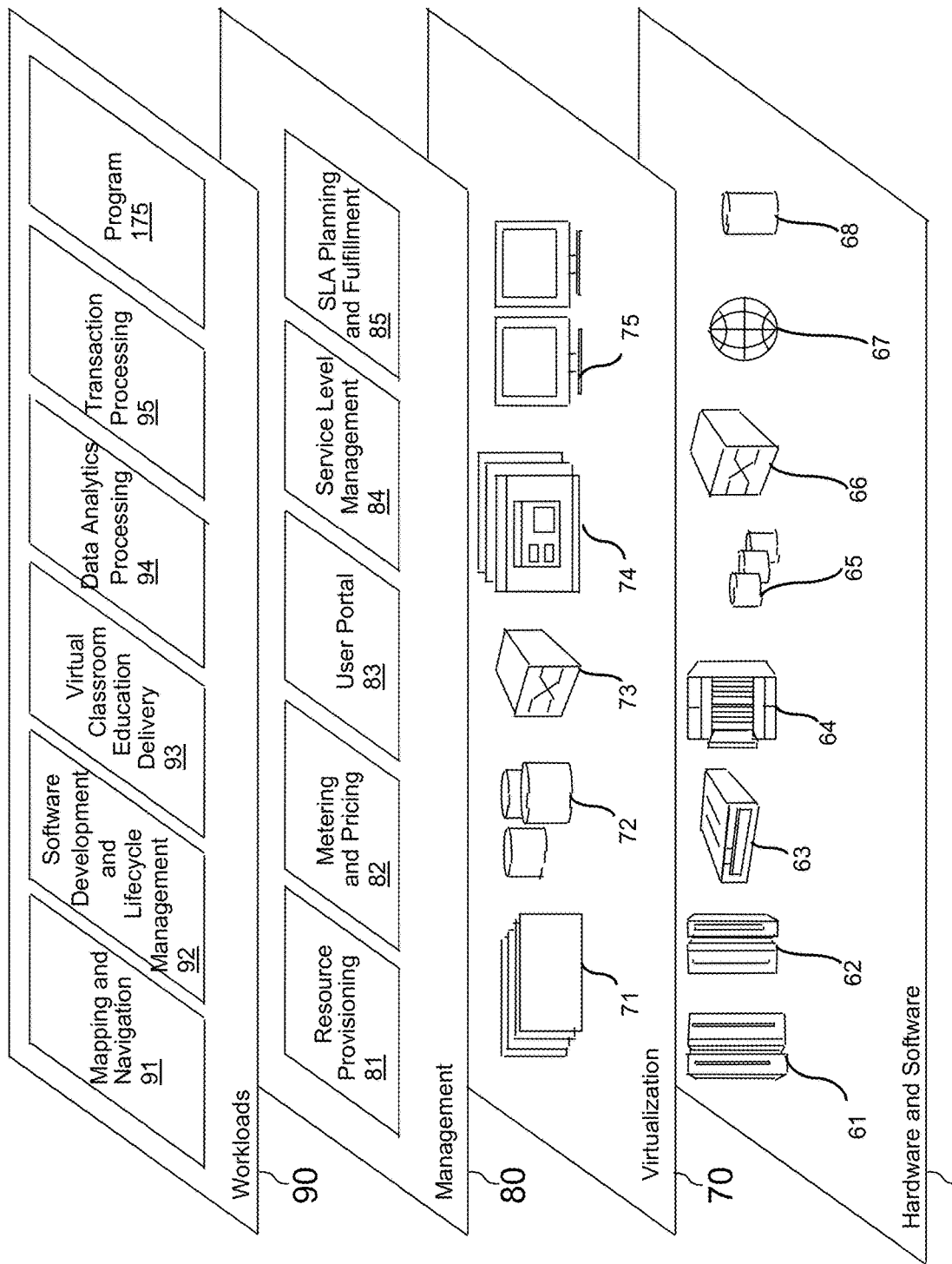
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communications security program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for establishing secure network communications, the method comprising:
    sending, by one or more server computer processors, a server certificate message in response to a client hello message, the certificate message comprising a first certificate associated with a first encryption algorithm and a second certificate associated with a second encryption algorithm, the first certificate and second certificate bound to each other;
    signing, by the one or more server computer processors, a first message associated with client-server communications using a first private key, the first private key associated with the first certificate;
    signing, by the one or more server computer processors, a second message associated with the client-server communications using a second private key, the second private key associated with the second certificate, the second message including the first message;
    sending, by the one or more server computer processors in response to receiving the client hello message, a server certificate verify message, the server certificate verify message comprising the first message and the second message;
    receiving, by the one or more server computer processors, a client certificate message in response to the server hello message, the client certificate message comprising a third certificate associated with the first encryption algorithm and a fourth certificate associated with the second encryption algorithm, the third certificate and fourth certificate bound to each other; and
    receiving, by the one or more server computer processors, a client certificate verify message, the client certificate verify message comprising a third message associated with client-server communications signed using a third private key, the third private key associated with the third certificate, and a fourth message associated with the client-server communications signed using a fourth private key, the fourth private key associated with the fourth certificate, the fourth message including the third message.

2. The computer implemented method according to claim 1, wherein the first encryption algorithm comprises a lattice-based encryption algorithm.

3. The computer implemented method according to claim 1, wherein the first message comprises a transcript of client-server messaging.

4. The computer implemented method according to claim 1, wherein the first certificate and the second certificate have an identical subject name.

5. The computer implemented method according to claim 1, wherein an attribute of the second certificate comprises a hashed value of the first certificate.

6. The computer implemented method according to claim 1, further comprising sending, by the one or more server computer processors, data encrypted using the first encryption algorithm.

7. A computer program product for establishing secure network communications, the computer program product comprising one or more computer readable storage devices and collectively stored program instructions on the one or more computer readable storage devices, the stored program instructions comprising:
    program instructions to send a server certificate message in response to a client hello message, the certificate message comprising a first certificate associated with a first encryption algorithm and a second certificate associated with a second encryption algorithm, the first certificate and second certificate bound to each other;
    program instructions to sign a first message associated with client-server communications using a first private key, the first private key associated with the first certificate;
    program instructions to sign a second message associated with the client-server communications using a second private key, the second private key associated with the second certificate, the second message including the first message;
    program instructions to send, in response to receiving the client hello message, a server certificate verify message, the server certificate verify message comprising the first message and the second message;
    program instructions to receive a client certificate message in response to the server hello message, the client certificate message comprising a third certificate associated with the first encryption algorithm and a fourth certificate associated with the second encryption algorithm, the third certificate and fourth certificate bound to each other; and
    program instructions to receive a client certificate verify message, the client certificate verify message comprising a third message associated with client-server communications signed using a third private key, the third private key associated with the third certificate, and a fourth message associated with the client-server communications signed using a fourth private key, the fourth private key associated with the fourth certificate, the fourth message including the third message.

8. The computer program product according to claim 7, wherein the first encryption algorithm comprises a lattice-based encryption algorithm.

9. The computer program product according to claim 7, wherein the first message comprises a transcript of client-server messaging.

10. The computer program product according to claim 7, wherein the first certificate and the second certificate have an identical subject name.

11. The computer program product according to claim 7, wherein an attribute of the second certificate comprises a hashed value of the first certificate.

12. The computer program product according to claim 7, the stored program instructions further comprising program instructions to send data encrypted using the first encryption algorithm.

13. A computer system for establishing secure network communications, the computer system comprising:
   one or more computer processors;
   one or more computer readable storage devices; and
   stored program instructions on the one or more computer readable storage devices for execution by the one or more computer processors, the stored program instructions comprising:
   program instructions to send a server certificate message in response to a client hello message, the certificate message comprising a first certificate associated with a first encryption algorithm and a second certificate associated with a second encryption algorithm, the first certificate and second certificate bound to each other;
   program instructions to sign a first message associated with client-server communications using a first private key, the first private key associated with the first certificate;
   program instructions to sign a second message associated with the client-server communications using a second private key, the second private key associated with the second certificate, the second message including the first message;
   program instructions to send, in response to receiving the client hello message, a server certificate verify message, the server certificate verify message comprising the first message and the second message;
   program instructions to receive a client certificate message in response to the server hello message, the client certificate message comprising a third certificate associated with the first encryption algorithm and a fourth certificate associated with the second encryption algorithm, the third certificate and fourth certificate bound to each other; and
   program instructions to receive a client certificate verify message, the client certificate verify message comprising a third message associated with client-server communications signed using a third private key, the third private key associated with the third certificate, and a fourth message associated with the client-server communications signed using a fourth private key, the fourth private key associated with the fourth certificate, the fourth message including the third message.

14. The computer system according to claim 13, wherein the first encryption algorithm comprises a lattice-based encryption algorithm.

15. The computer system according to claim 13, wherein the first message comprises a transcript of client-server messaging.

16. The computer system according to claim 13, wherein the first certificate and the second certificate have an identical subject name.

17. The computer system according to claim 13, wherein an attribute of the second certificate comprises a hashed value of the first certificate.

* * * * *